(12) United States Patent
Simonsson et al.

(10) Patent No.: US 8,688,049 B2
(45) Date of Patent: Apr. 1, 2014

(54) METHOD FOR PREDICTING CHANNEL QUALITY INDICATOR (CQI) VALUES

(75) Inventors: Arne Simonsson, Gammelstad (SE); Jan Christoffersson, Luleá (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1204 days.

(21) Appl. No.: 12/443,244

(22) PCT Filed: Oct. 5, 2006

(86) PCT No.: PCT/SE2006/050378
§ 371 (c)(1),
(2), (4) Date: Mar. 27, 2009

(87) PCT Pub. No.: WO2008/041893
PCT Pub. Date: Apr. 10, 2008

(65) Prior Publication Data
US 2010/0113028 A1   May 6, 2010

(51) Int. Cl.
*H04B 17/00* (2006.01)
(52) U.S. Cl.
USPC ............. 455/67.11; 455/452.2; 455/522; 455/561; 370/252
(58) Field of Classification Search
CPC .................................................. H04B 17/0075
USPC ............. 455/67.1, 67.11, 452.2, 522, 561; 370/252
See application file for complete search history.

(56) References Cited

U.S. PATENT DOCUMENTS

| 6,292,519 | B1 * | 9/2001 | Popovic ................. 375/346 |
| 7,047,016 | B2 * | 5/2006 | Walton et al. ............ 455/452.1 |
| 7,257,423 | B2 * | 8/2007 | Iochi ..................... 455/561 |
| 7,606,591 | B2 * | 10/2009 | Itoh et al. ............... 455/522 |
| 7,773,557 | B2 * | 8/2010 | Grant et al. .............. 370/328 |
| 2001/0019961 | A1 * | 9/2001 | Nakahara et al. ......... 455/522 |
| 2002/0186761 | A1 * | 12/2002 | Corbaton et al. ......... 375/231 |
| 2003/0016740 | A1 * | 1/2003 | Jeske et al. ............. 375/227 |
| 2004/0038658 | A1 | 2/2004 | Gurelli et al. |
| 2004/0146023 | A1 * | 7/2004 | Pietraski et al. ......... 370/333 |
| 2004/0190486 | A1 * | 9/2004 | Oshiba ................... 370/349 |
| 2004/0247059 | A1 * | 12/2004 | Seto et al. .............. 375/346 |
| 2005/0071039 | A1 * | 3/2005 | Mitrovic ................. 700/121 |
| 2005/0136840 | A1 * | 6/2005 | Molnar et al. ........... 455/63.1 |
| 2005/0191965 | A1 * | 9/2005 | Yu et al. ................ 455/67.16 |

(Continued)

FOREIGN PATENT DOCUMENTS

WO   2004/042982 A2   5/2004

*Primary Examiner* — Patrick Edouard
*Assistant Examiner* — Michael Irace
(74) *Attorney, Agent, or Firm* — Coats and Bennett PLLC

(57) ABSTRACT

The object of the present invention is to perform an enhanced prediction technique. The object is achieved by a method in a base station comprised in a radio access network. The base station is adapted to communicate with at least one user equipment, the method comprises the steps of receiving a sequence of CQI values sampled at the times $t=1, \ldots, n$, from one or more of the at least one user equipments; estimating for each of the received specific CQI value k, the conditional expectation of the CQI value at time $t+d$, given the specific CQI value k at time t; and obtaining a predicted CQI value for the specific CQI value k, which predicted CQI value is the estimated conditional expectation of the CQI values at a time $t+d$ for the specific CQI value k.

9 Claims, 5 Drawing Sheets

(56) References Cited

U.S. PATENT DOCUMENTS

| | | | |
|---|---|---|---|
| 2005/0195924 A1* | 9/2005 | Chen et al. | 375/343 |
| 2005/0208973 A1* | 9/2005 | Iochi | 455/561 |
| 2005/0227697 A1* | 10/2005 | Borst et al. | 455/450 |
| 2005/0260998 A1* | 11/2005 | Casaccia et al. | 455/452.2 |
| 2006/0025087 A1* | 2/2006 | Nilsson | 455/115.1 |
| 2006/0057965 A1* | 3/2006 | Braun et al. | 455/67.11 |
| 2006/0058055 A1* | 3/2006 | Shintani | 455/522 |
| 2006/0092905 A1* | 5/2006 | Do et al. | 370/342 |
| 2006/0141956 A1* | 6/2006 | Mikami et al. | 455/115.1 |
| 2007/0026803 A1* | 2/2007 | Malm | 455/63.1 |
| 2007/0173280 A1* | 7/2007 | Nakayauchi et al. | 455/522 |
| 2007/0286124 A1* | 12/2007 | Grant et al. | 370/331 |

* cited by examiner

METHOD FOR PREDICTING CHANNEL QUALITY INDICATOR (CQI) VALUES

TECHNICAL FIELD

The present invention relates generally to a method and an arrangement for a base station in a radio access network. In particular it relates to creating a CQI prediction value in the radio access network.

BACKGROUND OF THE INVENTION

In today's radio communication systems, different measurement techniques are used for estimating channel quality at a radio receiver.

These measurement techniques are employed e.g. in systems using access techniques such as Universal Mobile Telecommunications System (UMTS), and Worldwide Interoperability for Microwave Access (WiMax). WiMAX refers to broadband wireless networks that are based on the IEEE 802.16 standard. One such measurement technique is the Channel quality indicator (CQI). CQI is the term of the downlink quality report and is measured by the user equipment and sent to base station. CQI is an input to several algorithms.

The main purpose of CQI is for transport format selection, i.e. power, block size, modulation and coding. The High Speed Physical Downlink Shared Channel (HS-PDSCH) used in Universal Terrestrial Radio Access (UTRA) transmission power is selected based on the CQI to be received and detected by the user equipment with a certain probability such as typically 10% Block Error Rate (BLER). BLER is a ratio of the number of erroneous blocks to the total number of blocks received on a digital circuit. In case of high load and power limitation a smaller transport block size (TBS) than desired is selected. A smaller TBS means more coding and/or lower order modulation so that the block can be received by the user equipment when transmitted with lower power.

CQI is also used for power control of the High Speed Shared Control Channel (HS-SCCH) channel. Also Media Access Control (MAC) scheduling of packets/users on the shared High Speed Physical Downlink Shared Channel (HS-PDSCH) channel can be based on CQI. Best Signal-to-Interference Ratio (SIR) and Proportional Fair (PF) scheduling are examples of CQI-based scheduling algorithms.

Evolved UTRA (E-UTRA) may also include a similar downlink quality measurement by the user equipment sent to base station and used for Radio Resource Management (RRM) algorithms. There may also be one CQI-measurement per group of sub-carriers.

One major drawback of a transport format selection technique is that it is based on a closed loop measured quality which will be outdated due to processing and transport delays when the block is sent, i.e., the reported CQI at time t, is used to select the TBS of the transport block (TB) sent at time t+d. It is also costly (radio resource and power/battery . . . ) for the uplink to report the CQI each TTI. Typically the CQI reporting interval is less frequent which results in more delays of the measurement.

Also E-UTRA CQI measurements will be delayed from user equipment to base station. More CQI measurements are expected per user equipment for sub-carrier selection and power control purposes. Decreasing the reporting interval will be a costly way to shorten the delay.

WO 2004/042982 discloses a method of improved performance through channel quality prediction for communications systems employing link adaption techniques. The system includes a receiver which makes selective measurements on downlink transmissions, and then stores one or more of the measurements or a channel quality indicator derived there from. The receiver then retrieves one or more of the past measurements (or the past channel quality estimates themselves), and combines it with current measurements (or the current channel quality estimate), to predict what the channel quality will be at some future time and derive a predictive CQI. This predictive CQI, derived from both current channel measurements and at least one past channel measurement, is then sent to the transmitter for use in updating transmission parameters. The problem with this system is that all predictions are done in the user equipment. Doing the predictions in the user equipment is risky since different user equipments could do this in different ways, making the behavior different between user equipments. This could be caused by different prediction techniques used in different user equipments. Changing the reported CQI in the user equipment leaves the base station unaware of what is being reported as CQI to the base station.

US 2005/0227697 depicts techniques and systems for channel prediction in wireless networks. In this system a base station receives a succession of channel indicators from each of a plurality of mobile units, each channel indicator being received from each mobile unit once per timeslot. A channel predictor uses the channel indicators to generate a channel condition prediction for each mobile unit, the channel condition prediction being based on a balanced estimate using the most recent channel condition indicator and the mean of the succession of channel indicators. A weight is computed based on a gradient of the succession channel indicator values and used to assign relative emphasis to the most recent channel condition indicator and the mean channel condition indicator in order to give greater emphasis to the most recent indicator during slowly changing conditions and greater emphasis to the mean indicator during rapidly changing conditions. This prediction technique may work satisfactory in some cases but it is not clear that it will be efficient in typical cases. For example, in slowly varying channel conditions, an extreme channel condition will typically be followed by channel conditions far from the mean. Prediction according to solution may result in too coarse predictions.

SUMMARY OF THE INVENTION

It is therefore an object of the present invention to provide a mechanism for an enhanced prediction technique.

According to a first aspect of the present invention, the object is achieved by a method in a base station comprised in a radio access network. The base station is adapted to communicate with at least one user equipment, the method comprises the steps of receiving a sequence of CQI values sampled at the times t=1, . . . , n, from one or more of the at least one user equipments; estimating for each of the received specific CQI value k, the conditional expectation of the CQI value at time t+d, given the specific CQI value k at time t; and obtaining a predicted CQI value for the specific CQI value k, which predicted CQI value is the estimated conditional expectation of the CQI values at a time t+d for the specific CQI value k.

According to a second aspect of the present invention, the object is achieved by an arrangement in a base station. The base station is comprised in a radio access network and is adapted to communicate with at least one user equipment. The base station arrangement comprises a receiver adapted to receive a sequence of CQI values sampled at the times t=1, . . . , n, from one or more of the at least one user equipments. The base station arrangement further comprises an estimation unit adapted to estimate for each of the received specific CQI value k, the conditional expectation of the CQI value at time t+d, given the specific CQI value at time t. The base station arrangement further comprises a predicting unit adapted to obtain a predicted CQI value k for the specific CQI value k. which predicted CQI value is the estimated conditional expectation of the CQI values at a time t+d for the specific CQI value k.

Since the base station receives a sequence of CQI values sampled at the times t=1, . . . , n, from one or more of the at least one user equipments and it is estimated for each of the received specific CQI values of a specific CQI value k, the conditional expectation of the CQI value at time t+d, given the specific CQI value at time t. And Since a predicted CQI value for the specific CQI value k is obtained, an adjusted CQI at time t+d can be used which is more correct than simply using the reported CQI at time t since the adjusted CQI value will likely be closer to the true, yet unknown, CQI value at time t+d, than what the reported CQI value at time t is.

An advantage using an adjusted CQI at time t+d according to the present invention instead of simply using the reported CQI at time t input to the TBS algorithm is that a more suitable TBS can be chosen. This will result in a BLER that is closer to the target BLER than otherwise is the case. Using the reported CQI will typically result in a higher BLER than desired. Also the BLER will be less dependent (independent) of TBS.

A further advantage of the present invention is that the adjusted CQI value can also be used to improve the performance of scheduling and HS-PDSCH power control.

A further advantage of the present invention is that the method will also improve E-UTRA algorithms in base station based on a user equipment reported quality measurement similar to CQI.

A further advantage of the present invention is that that the handover execution time is reduced.

DETAILED DESCRIPTION OF PREFERRED EMBODIMENTS

The invention is defined as a method and an arrangement which may be put into practice in the embodiments described below.

Figure 1:
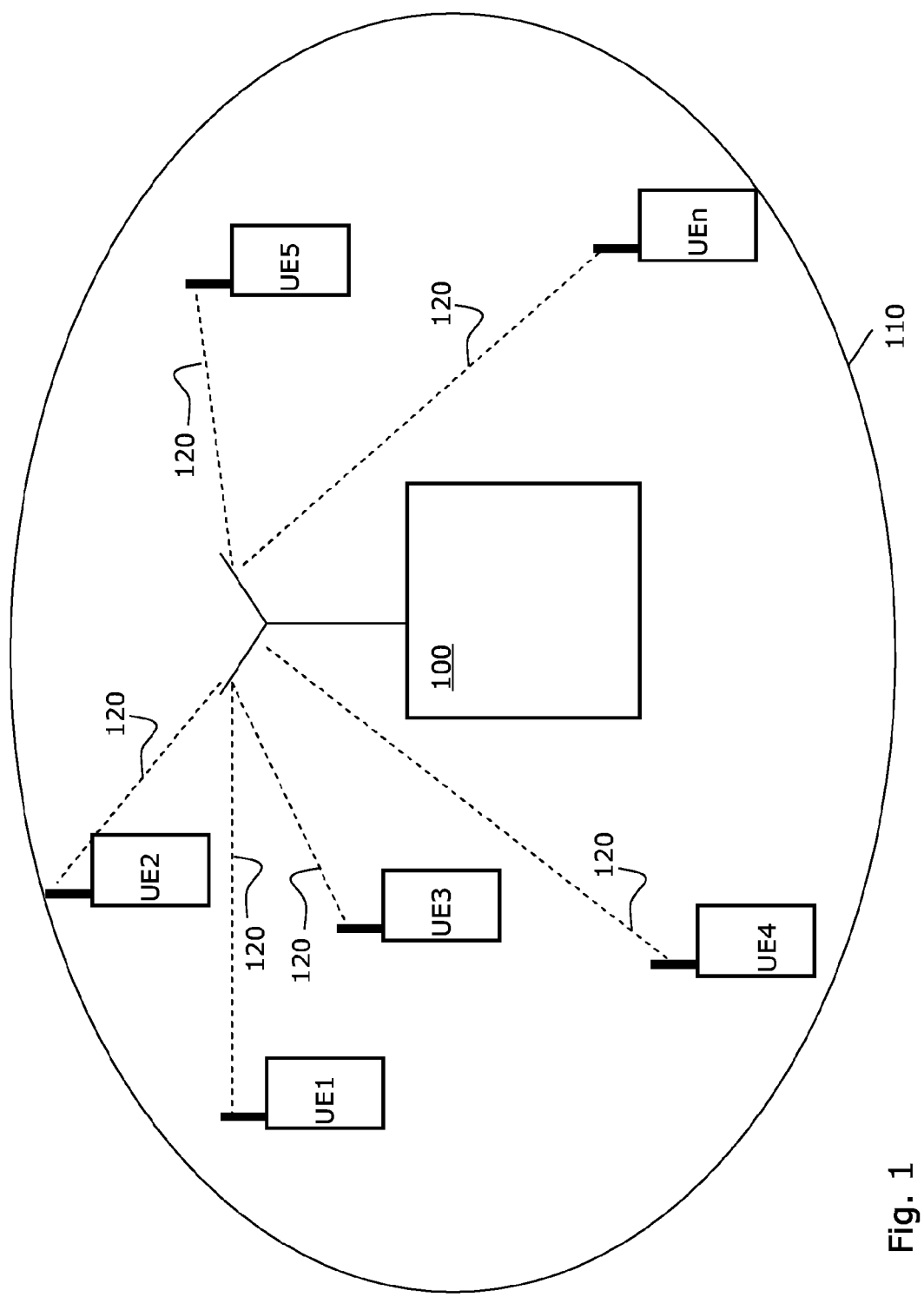
FIG. 1 is a schematic block diagram illustrating communication in a cell comprised in a radio access network.

FIG. 1 depicts a base station 100 communicating in a cell 110 comprised in a radio access network such as e.g. UMTS, E-UTRA, WiMax, Wireless Local Area Network (WLAN) and Global System for Mobile communication (GSM). The radio access network comprises at least one, commonly a number of cells whereof one cell 110 is depicted in FIG. 1. The base station 100 may be any suitable base station such as e.g. a Node-B in UMTS or E-UTRA, a base station in WiMax, a Base Transceiver Station (BTS) in GSM, Access Point (AP) in WLAN etc. The base station 100 is adapted to communicate with a number of user equipments UE1, UE2, UE3, UE4, UE5, an additional number of user equipments not shown, up to UEn. The base station 100 is adapted to communicate with the user equipments UE1, UE2, UE3, UE4, UE5, UEn using radio communication, which radio communication is referred to as dashed lines 120.

The first part of the present method describes how to create an initial CQI prediction value and further to create a reference prediction table that the base station 100 will use as a reference CQI prediction value. The reference table may be used initially during the start-up phase of a call between the base station and an individual user equipment or when a handover is performed, when no additional information is known about the individual user equipment and where the base station 100 uses it to predict CQI at time t+d.

Each of the user equipments UE1, UE2, UE3, UE4, UE5 and UEn sends frequently CQI values to the base station 100. The frequency of which the CQI values are sent is controlled by the base station 100 with a broadcast information to all the user equipments UE1, UE2, UE3, UE4, UE5 and UEn in the cell 110 and may vary depending on vendor implementation or parameter setting, they may for example be sent each $8^{th}$ ms. The CQI value is denoted k and may as in this example vary between e.g. integers 0 and 30 such as in e.g. UTRA. For example, a first user equipment UE1 may report the CQI values:

k=25 at t=1, k=28 at t=2, k=26 at t=3, k=7 at t=4 and k=16 at t=5, during a first time period, a second user equipment UE2 may report the CQI values k=26 at t=1, k=23 at t=2, k=26 at t=3, k=22 at t=4 and k=19 at t=5, during the same first time period and a third user equipment UE3 may report the CQI values k=21 at t=1, k=21 at t=2, k=29 at t=3, k=22 at t=4 and k=26 at t=5, during the same first time period.

The base station 100 receives the sequences of CQI values from the user equipments UE1, UE2, UE3, UE4, UE5 and UEn. For the creation of a reference CQI prediction table associated to the cell 110, the base station 100 collects CQI values from the user equipments UE1, UE2, UE3, UE4, UE5 and UEn in the cell 110 during a specific time period. The reference table is created by stating for each of the CQI values at a time t, which CQI values in this example are the integers between 0 and 30, also a predicted CQI value at the time t+d, where d is the delay time for which the CQI shall be predicted. That is, if the CQI at a time is denoted by $X_t$, then the CQI prediction table is the estimated conditional expectation for all CQI values, e.g. an estimate of $E(X_{t+d}|X_t=k)$, k=0, . . . , 30, for the cell and UE type. k is the CQI value and E is Expected value of X at time t+d, conditional on that the value of X at time t was k.

An example of such a reference CQI prediction table is Table 1.

TABLE 1

Example of estimated reference CQI prediction table for a cell

| | | | | | | |
|---|---|---|---|---|---|---|
| CQI at t | . . . | 21 | 22 | 23 | 24 | . . . |
| Predicted CQI at t + d | . . . | 19.5 | 21.55 | 22.15 | 23.65 | . . . |

Therefore the base station 100 collects the CQI values at a time t, from the user equipments UE1, UE2, UE3, UE4, UE5 and UEn in the cell 110 during a specific time period, in this example denoted the first time period. This time period may preferably be long, so that a large number of CQI values can be collected which provides a reliable reference CQI prediction table, typically, between 1 and 36 hours, preferable 24 hours so that all traffic peaks during a day and a night are comprised. However, in this example the first time period comprises t=1, t=2, t=3, t=4 and t=5. During this first time period, the base station 100 receives from the first user equipment UE1, the CQI sequence
k=25 at t=1, k=28 at t=2, k=26 at t=3, k=7 at t=4 and k=16 at t=5,
from the second user equipment UE2, the CQI sequence
k=26 at t=1, k=21 at t=2, k=26 at t=3, k=22 at t=4 and k=19 at t=5,
and from the third user equipment UE3 the CQI values
k=21 at t=1, k=23 at t=2, k=29 at t=3, k=22 at t=4 and k=26 for t=5
and a lot of other CQI values from the rest of the user equipments in the cell 110. This means that the base station 100 has collected from the first, second and third user equipments UE1, UE2 and UE3, one CQI value each of k=7, k=16, k=19, k=23, k=25, k=28 and k=29, two CQI values for k=21 and k=22 four CQI values for k=26. The base station 100 has further received a lot of additional CQI values from the rest of the user equipments in the cell 110, but they are disregarded in this example for easier understanding. When these values are collected, the base station 100 obtains for each of the different CQI values at a time t, in this example are the integers between 0 and 30, a predicted CQI value associated to the time t+d, where in this example d=2. The predicted CQI value is denoted by $\hat{X}_{t+d}^{Ref}(k)$ and is obtained by means of $$\hat{X}_{t+d}^{Ref}(k) = \frac{1}{(\#X_t = k)}\sum_t (X_{t+d} \mid X_t = k).$$

where # is "the number of", i.e. in this example, the number of received CQI values where the CQI at time t equals k. In the example, two CQI values were received for k=21. A first CQI value at the time t+d (i.e. t+2) is obtained for the first k=21 (which were received by the second user equipment UE2 at t=2), which in this example results in the CQI value from the second user equipment UE2 received at t=4, which in this case is 22. A second CQI value at the time t+d is obtained for the second k=21 (which were received by the third user equipment UE3 at t=1), which in this case results in the CQI value received from the third user equipment UE3 at t=3, which in this case is 29. The reference table is based on the mean of CQI at time t+d, conditional on the measured CQI at time. This means that for k=21 in the reference table, the predictable CQI value at the time t+d is the mean of 22 and 29, which results in. 25.5. I.e. for k=21, the predictable CQI value at time t+d is 25.5. The CQI mean values for time t+d for each of the remaining k=0, k=1, . . . up to k=20, k=22, . . . up to k=30 are obtained in the same way and the result is compiled in a reference CQI prediction table.

Such a reference table may be estimated for each cell within the radio access network based on the reported CQIs reflecting the radio environment and typical mobility in the respective cell. Individual reference tables for each cell may also be estimated specifically for different types of user equipment type such as different user equipment brands and models (e.g. Ericsson W800). The reference table may remain fixed over long time periods such as e.g. for months until the radio network is changed, for example new neighbor cells are added, or user mobility is changed within the cell, such as new buildings or roads. To be useful as a reference, it is preferably estimated using a large amount of data under different and representative conditions of e.g. the system load. This is done to give a reference prediction table that fits reasonable in most situations. Representative conditions are obtained by spreading the observations over different times according to the traffic load. It could also be possible to have different reference tables during different times, e.g. busy hour, at night etc., if the conditional expectation depends on the system load. When a user equipment UE1, UE2, UE3, UE4, UE5 and UEn reports a CQI, the base station 100 maps it to the estimated CQI at time t+d according to the table. This estimated CQI value for time t+d is used in algorithms based on CQI, such as e.g. transport format selection, executed with a delay d from the measurement in the user equipment UE1, UE2, UE3, UE4, UE5 and UEn.

The present method may further comprise a continuously computing of a CQI prediction value and CQI prediction table (individual CQI prediction table) for one individual user equipment of the user equipments UE1, UE2, UE3, UE4, UE5 and UEn, to account for e.g. the mobility of the UE, indoors usage etc. Two users in the same cell with the same user equipment characteristics may experience different radio characteristics. In this example the individual user equipment is the user equipment UE1. The computing of the individual CQI prediction value and table may be started when the communication session between the individual user equipment UE1 and the base station 100 starts. It may continue for an arbitrary long time, such as e.g. for the whole session or for the first second. It is preferably to obtain using a predetermined amount of the latest received CQI values, such as the latest 100.

The base station 100 receives sequences of CQI values from the individual user equipments UE1. For the creation of the individual CQI prediction value, the base station 100 starts to collect CQI values from the individual user equipment UE1 during the start-up phase of the communication session between the individual user equipment UE1 and the base station 100.

The reported CQI values are used to estimate the CQI at time t+d, given the CQI at time t. The reported CQIs from the individual user equipment UE1 are used to estimate a new predicted CQI value based on the conditional expectation for the CQI values at time t+d given a sample of the CQI values at time t of the individual user equipment UE1, e.g. $E(X_{t+d}|X_t=k)$, where k=0, 1, . . . , 30 are the CQI values at time t for the individual user equipment UE1 in this example. The predicted CQI value is estimated, in the same manner as the reference prediction table, as the average of this transition, i.e. $E(X_{t+d} \mid X_t = 2)$ is estimated by $$\frac{1}{\#(X_t = 2)}\sum_t (X_{t+d} \mid X_t = 2) \qquad (1)$$

where # is "the number of", i.e. in this example, the number of observations where the CQI at time t equals two. The difference is that only the CQI values for this individual user are used in (1).

The sample CQI predictor based on (1) is denoted by $\hat{X}_{t+d}^{Sample}(k)$.

In a second scenario, a communication session between the base station 100 and an individual user equipment UE4 is set-up. Regarding the received CQI values, the base station now focus on the received CQI values from the individual user equipment UE4. When the number of reported CQI values still are low from the individual user equipment UE4 and until an individual predictor of CQI at time t+d, i.e. the sample CQI predictor $\hat{X}_{t+d}^{Sample}(k)$ is estimated with enough observations, the base station 100 may use information from the reference CQI prediction value to form a weighted average between the reference CQI prediction value and the sample CQI predictor at time t+d for the individual user equipment UE4, to predict the CQI at time t+d. A weighted average may be used to predict the CQI values for the individual user equipment UE4. The weighted average on the estimation (α) is updated as a function of collected statistics during the ongoing communication session for the individual sample CQI prediction value. Starting with α=1 at the start of the communication session and decreasing it for increased collected CQI value statistics during the ongoing communication session. The estimated CQI to be used in algorithms is formed by combining the individual user equipment estimated CQI with a weight 1−α and reference CQI with a weight α.

The weighted average between the reference CQI prediction value and the sample CQI predictor at time t+d for the individual user equipment UE4 is obtained by using:

$$\hat{X}_{t+d}^{Pred}(k) = \alpha \hat{X}_{t+d}^{Ref}(k) + (1-\alpha)\hat{X}_{t+d}^{Sample}(k)$$

where $\hat{X}_{t+d}^{Pred}(k)$ is the predicted CQI formed by combining the prediction from the reference value $\hat{X}_{t+d}^{Ref}(k)$ and the prediction based on the sample CQI prediction from the individual user equipment UE4, where the weight a satisfies 0≤α≤1. Initially at start-up, α is 1 and approaches 0 as the sample size used to estimate $\hat{X}_{t+d}^{Sample}(k)$ increases, typically α=0 when 30 samples are collected.

The measured CQI for the individual user equipment UE4 is replaced by the adjusted CQI=$\hat{X}_{t+d}^{Pred}$(measuredCQI) as input to in algorithms based on CQI, such as TBS selection algorithm for the individual user equipment UE4.

The individual CQI prediction table is created by the base station 100 for the individual user equipment UE4 by stating for each of the CQI values at a time t, which CQI values in this example are the integers between 0 and 30, also a predictable CQI value at the time t+d, where d is the delay time for which the CQI shall be predicted. The base station 100 then continuously updates the sample CQI predictor $\hat{X}_{t+d}^{Sample}(k)$ for all CQI values (k), for the individual user equipment UE4. The same procedure may be performed for all the individual user equipments UE1, UE2, UE3, UE4, UE5 and UEn in the cell 100.

Figure 2:
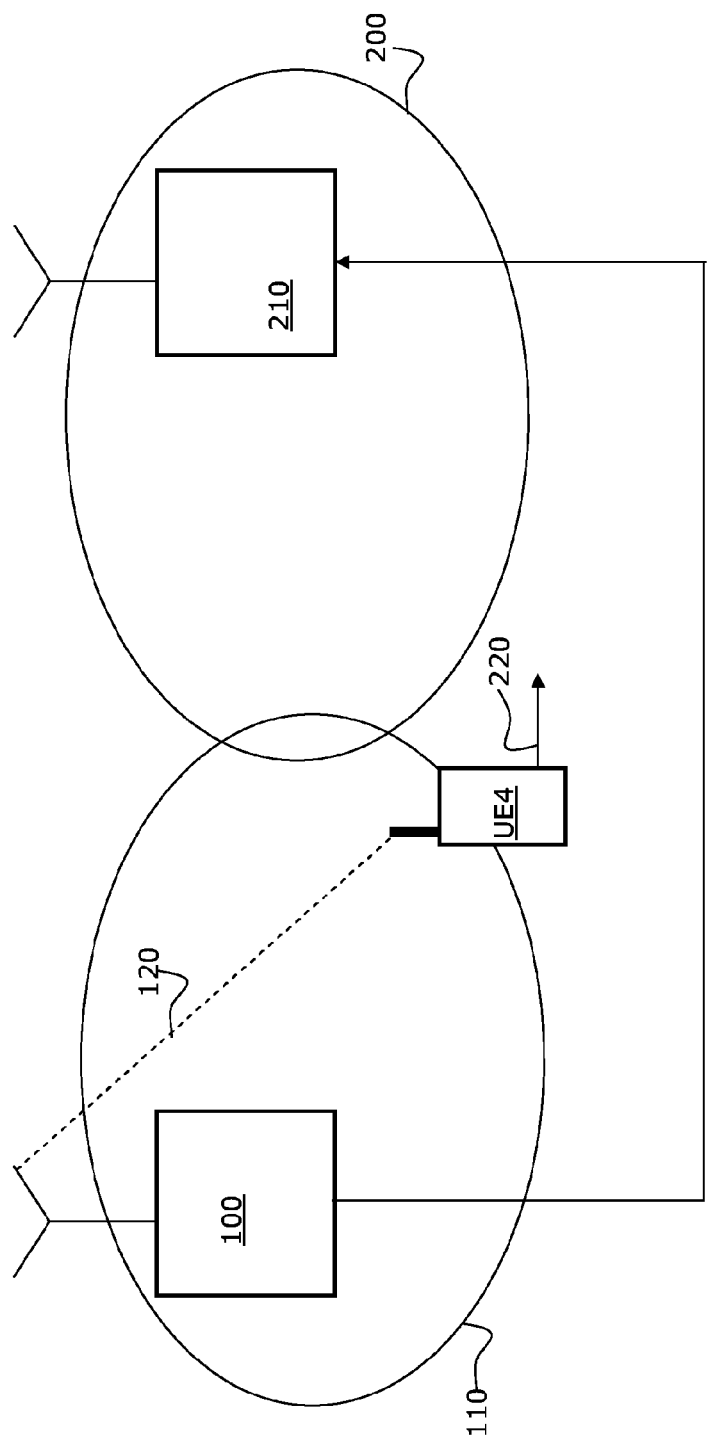
FIG. 2 is a schematic block diagram illustrating a handover in the radio access network.

FIG. 2 depicts a handover scenario for handover an individual user equipment, in this example the individual user equipment UE4, from a source cell, in this example the cell 110 served by the base station 100, to a destination cell 200 served by a destination base station 210. The individual user equipment UE4 moves towards the destination cell 200 in the direction pointed out by the arrow 220. The destination base station 210 has created a reference CQI prediction values according to the method described above.

At handover, when the user equipment UE4 enters the destination cell 210, the estimated CQI at time t+d, i.e. such as the individual sample CQI prediction values, for the individual user equipment UE4 is sent to the destination base station 210. This makes it possible to avoid the start-up phase when entering the destination cell since the CQI predictions at time t+d in the destination cell 200 can be done using both a reference CQI prediction values created by the destination base station 210 and the individual sample CQI prediction values for the individual user equipment UE4 created by the source cell, i.e. the cell 110. As an alternative solution, the reference CQI prediction values of the destination cell and the user equipment type may be used initially if such reference CQI prediction values are created.

The source base station, i.e. the base station 100, the estimated sample CQI predictor for the individual UE4, $\hat{X}_{t+d}^{Sample}(k)$, is sent to the destination base station 210 serving the destination cell 200. The $\hat{X}_{t+d}^{Sample}(k)$ is a vector of a number of elements, i.e. in this example 30 elements (k=0, . . . , 30).

In the above embodiment, it is assumed that the conditional expectation at time t+d conditional on the CQI value at time t gives sufficient precision. It is also possible to take more observations into account, e.g. the CQI values at t, t−1, t−2, and thereby enhance the predictions.

The same estimation technique may be applied to other algorithms in the base station 100 that are based on CQI measurement such as proportional fair scheduling and HS-PDSCH power control. A different delay d may apply depending on processing time in base station 100.

As mentioned above, the present method may be applicable on accesses such as E-UTRA as well. A downlink quality measurement by the user equipment that should be sent to base station may be standardized also in E-UTRA. Such a measurement will always be delayed before algorithm execution in downlink. Also the WiMax standard contains similar CQI reporting with the same type of delay error . . . .

Figure 3:
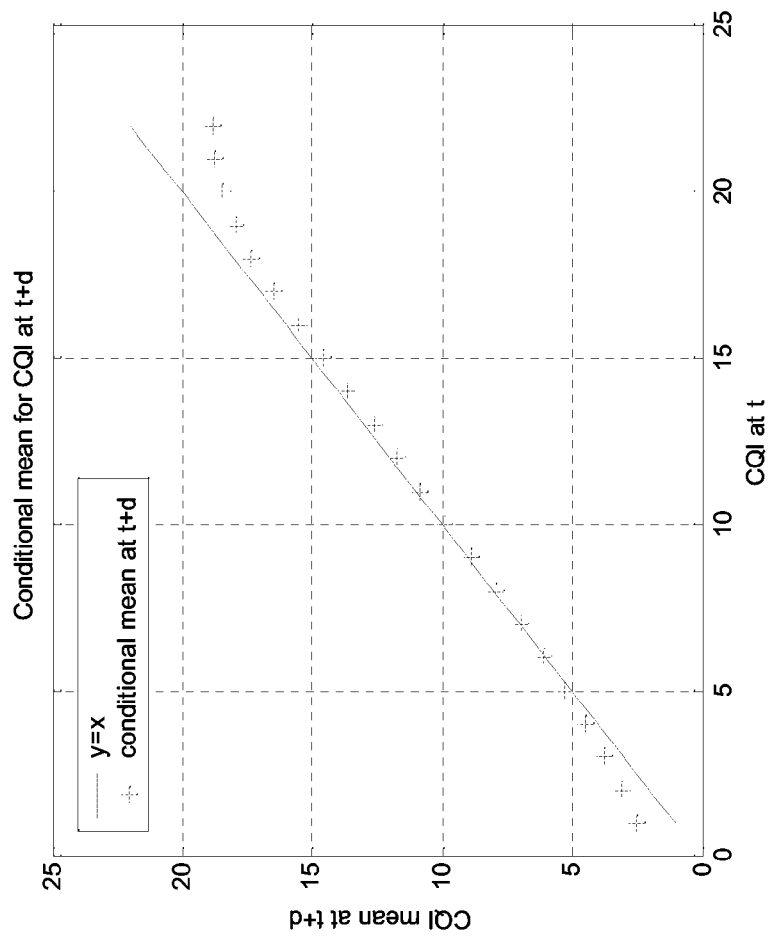
FIG. 3 is a diagram depicting the conditional distribution adjusting measured CQI.

FIG. 3 is a diagram wherein the x-axis refers to the CQI value at time t and the y-axis refers to the CQI value at a time t+d. The diagram shows that the conditional distribution adjusts the measured CQI values considerably, especially for large and small CQI values.

Figure 4:
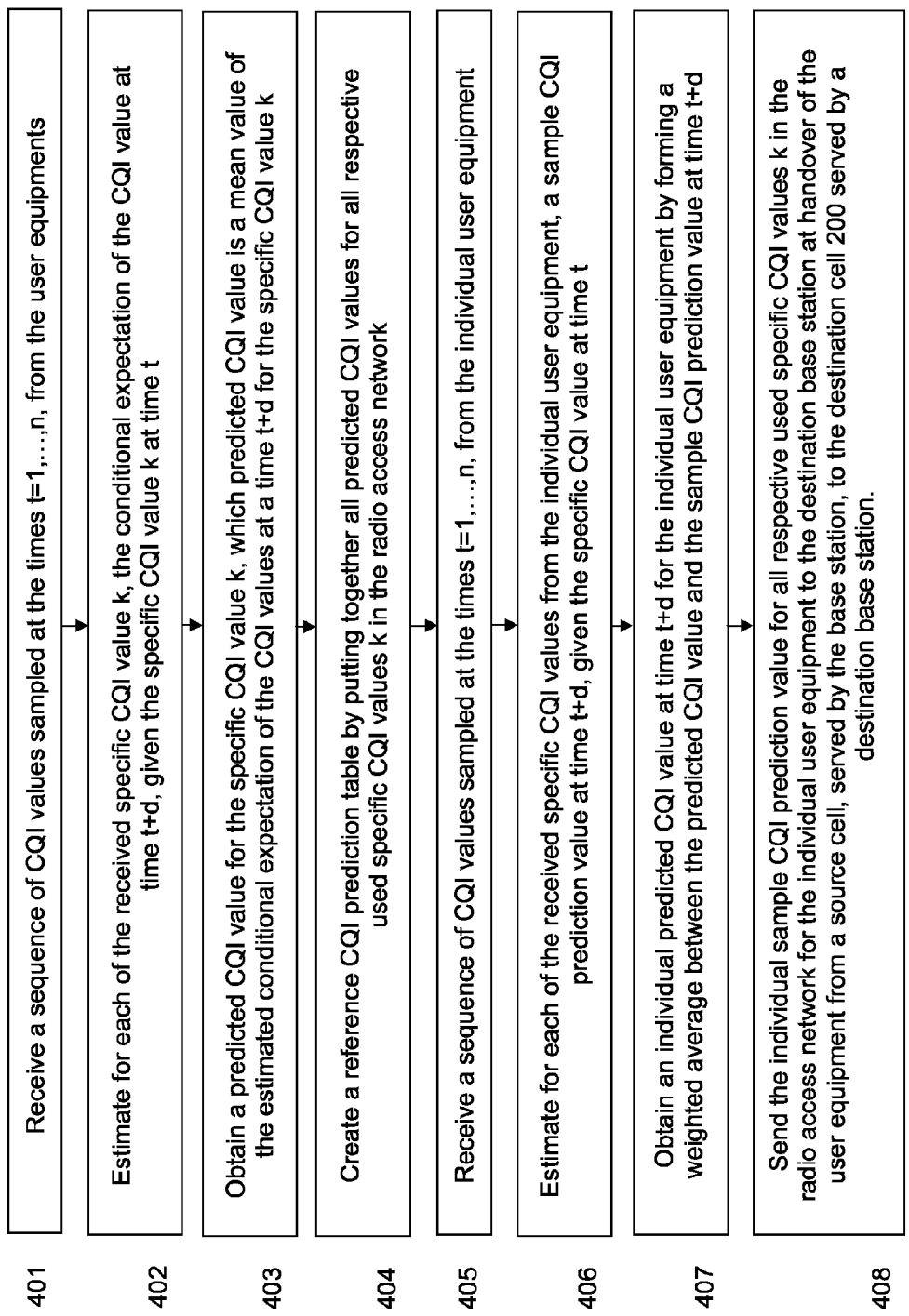
FIG. 4 is a flow chart illustrating a method for creating a CQI prediction value in a base station within the radio access network.

The present method steps in the base station 100 for creating a CQI prediction value will now be described with reference to a flow chart depicted in FIG. 4. The method comprises the steps of:

401. The base station 100 receives a sequence of CQI values sampled at the times t=1, . . . , n, from one or more of the at least one user equipments UE1, UE2, UE3, UE4, UE5, UEn.

402. The base station 100 estimates for each of the received specific CQI value k, the conditional expectation of the CQI value at time t+d, given the specific CQI value k at time t.

403. The base station 100 obtains a predicted CQI value for the specific CQI value k, which predicted CQI value is the estimated conditional expectation of the CQI values at a time t+d for the specific CQI value k. The predicted CQI value is denoted by $\hat{X}_{t+d}^{Ref}(k)$ and the predicted CQI value may be obtained by means of $$\hat{X}_{t+d}^{Ref}(k) = \frac{1}{(\#X_t = k)} \sum_t (X_{t+d} | X_t = k).$$

where $X_t$ is the CQI at time t, and where # is the number of received CQI values where the CQI at time t equals k. The base station 100 may further obtain a predicted CQI value for all respective used specific CQI values k in the radio access network. The specific CQI values k in the used radio access network may be the integers 0-30.

404. The base station 100 may create a reference CQI prediction table by putting together all predicted CQI values for all respective used specific CQI values k in the radio access network.

405. In this step a communication session between the base station 100 and an individual user equipment UE4 may be set-up, and the base station 100 receives a sequence of CQI values sampled at the times t=1, ..., n, from the individual user equipment UE4 during the communication session between the base station 100 and an individual user equipment UE4.

406. The base station 100 may estimate for each of the received specific CQI values from the individual user equipment UE4, a sample CQI prediction value at time t+d, given the specific CQI value at time t.

407. The base station 100 may obtain an individual predicted CQI value at time t+d for the individual user equipment UE4 by forming a weighted average between the predicted CQI value and the sample CQI prediction value at time t+d. The weighted average is updated as a function of the statistics of received sequence of CQI values during the ongoing communication session for the individual sample CQI prediction value, starting with α=1 at the start of the communication session and decreasing it for increased received CQI value statistics during the ongoing communication session. The weighted average between the predicted CQI value and the sample CQI prediction value at time t+d for the individual user equipment (UE4) may be obtained by using $\hat{X}_{t+d}^{Pred}(k)=\alpha \hat{X}_{t+d}^{Ref}(k)+(1-\alpha)\hat{X}_{t+d}^{Sample}(k)$ where $\hat{X}_{t+d}^{Pred}(k)$ is the individual predicted CQI value, the predicted CQI value from the reference table and $\hat{X}_{t+d}^{Sample}(k)$ is the individual sample CQI prediction value from the individual user equipment UE4, where the weight a satisfies $0 \leq \alpha \leq 1$ and α is 1 Initially at start-up of the communication session and approaches 0 as the sample size used to estimate $\hat{X}_{t+d}^{Sample}(k)$ increases.

408. In the next step the individual user equipment UE4 may perform a handover from a source cell 110, served by the base station 100, to the destination cell 200 served by a destination base station 210. The base station 100 may send the individual sample CQI prediction value for all respective used specific CQI values k in the radio access network for the individual user equipment UE4 to the destination base station 210. The destination base station 210 may create an individual sample CQI prediction value at time t+d for the individual user equipment UE4 in the destination cell 200 by using both reference CQI prediction values created by the destination base station 210 and the individual sample CQI prediction value for the individual user equipment UE4 created by the base station 100 in the source cell 110.

Figure 5:
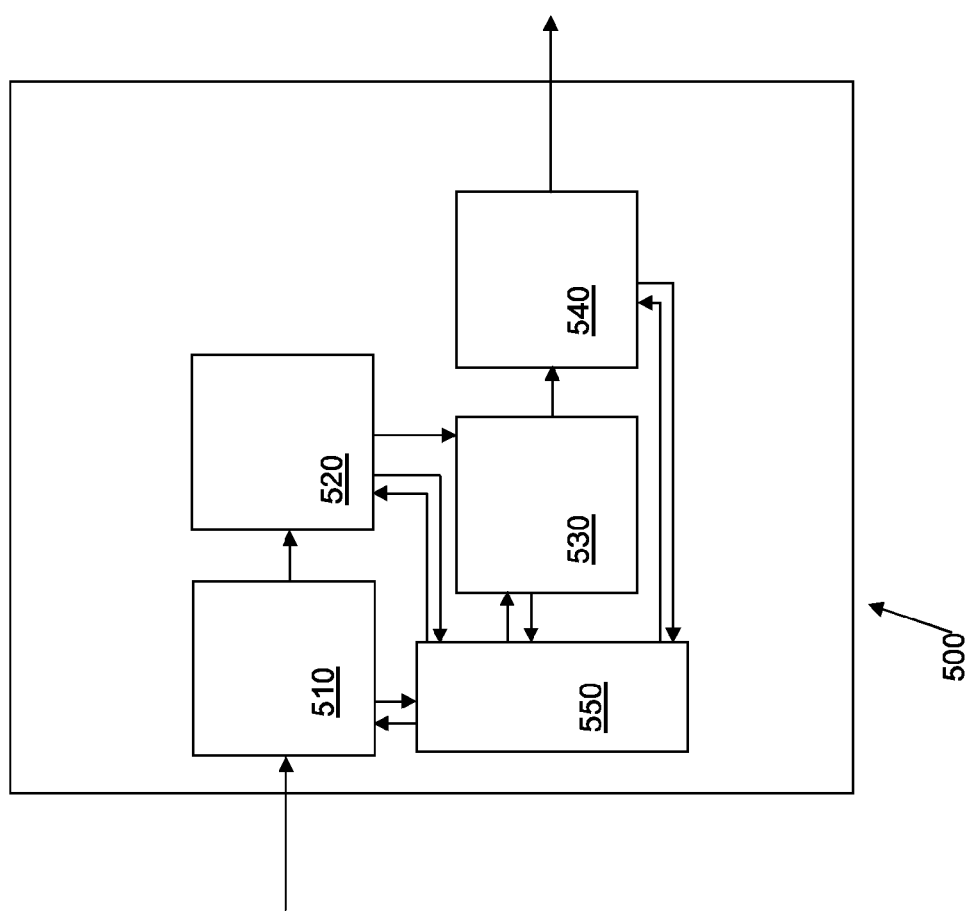
FIG. 5 is a schematic block diagram illustrating an arrangement in a base station within the radio access network.

To perform the method steps for creating a CQI prediction value, the base station 100 comprises an arrangement 500 depicted in FIG. 5.

The base station arrangement 500 comprises a receiver 510 adapted to receive a sequence of CQI values sampled at the times t=1, ..., n, from one or more of the at least one user equipments UE1, UE2, UE3, UE4, UE5, UEn.

The base station arrangement 500 further comprises an estimation unit 520 adapted to estimate for each of the received specific CQI value k, the conditional expectation of the CQI value at time t+d, given the specific CQI value k at time t.

The base station arrangement 500 further comprises a predicting unit 530 adapted to obtain a predicted CQI value for the specific CQI value k. The predicted CQI value is the estimated conditional expectation of the CQI values at a time t+d for the specific CQI value k. The predicting unit 530 may further be adapted to obtain a predicted CQI value for all respective used specific CQI values k in the radio access network and to create a reference CQI prediction table by putting together all predicted CQI values for all respective used specific CQI values k in the radio access network.

In one embodiment, the base station 100 further is adapted to set-up a communication session between the base station 100 and an individual user equipment UE4. In this embodiment the receiver 510 further is adapted to receive a sequence of CQI values sampled at the times t=1, ..., n, from the individual user equipment UE4 during the communication session between the base station 100 and an individual user equipment UE4. In this embodiment the estimation unit 520 further is adapted to estimate for each of the received specific CQI values from the individual user equipment UE4, a sample CQI prediction value at time t+d, given the specific CQI value at time t. In this embodiment the predicting unit 530 further is adapted to obtain an individual predicted CQI value at time t+d for the individual user equipment UE4 by forming a weighted average between the predicted CQI value and the sample CQI prediction value at time t+d. The weighted average is adapted to be updated as a function of the statistics of received sequence of CQI values during the ongoing communication session for the individual sample CQI prediction value, starting with α=1 at the start of the communication session and decreasing it for increased received CQI value statistics during the ongoing communication session.

In another embodiment the individual user equipment UE4 is adapted to perform a handover from a source cell 110 served by the base station 100, to a destination cell 200 served by a destination base station 210. In this embodiment the base station arrangement 500 further comprises a transmitter 540. The transmitter 540 is further adapted to send the individual sample CQI prediction value for all respective used specific CQI values k in the radio access network for the individual user equipment UE4 to the destination base station 210. The destination base station 210 is adapted to create an individual sample CQI prediction value at time t+d for the individual user equipment UE4 in the destination cell 200 by using both reference CQI prediction values adapted to be created by the destination base station 210 and the individual sample CQI prediction value for the individual user equipment UE4 adapted to be created by the base station 100 in the source cell 110.

The present CQI prediction value creating mechanism may be implemented through one or more processors, such as the processor 550 in the base station arrangement 500 depicted in FIG. 5, together with computer program code for performing the functions of the invention. The program code mentioned above may also be provided as a computer program product, for instance in the form of a data carrier carrying computer program code for performing the present method when being loaded into the base station 100. One such carrier may be in the form of a CD ROM disc. It is however feasible with other data carriers such as a memory stick. The computer program code can furthermore be provided as pure program code on a server and downloaded to the base station 100 remotely.

The present invention is not limited to the above-describe preferred embodiments. Various alternatives, modifications and equivalents may be used. Therefore, the above embodiments should not be taken as limiting the scope of the invention, which is defined by the appending claims.

The invention claimed is:

1. A method of predicting Channel Quality Indicator (CQI) values, the method being performed at a base station operating in a radio access network and comprising: receiving a sequence of Channel Quality Indicator (CQI) values sampled at times t=1 . . . n, from a plurality of user equipment; estimating, for each received specific CQI value k, a conditional expectation of the CQI value k at a time t+d, given the specific CQI value k at time t; and obtaining a predicted CQI value for the specific CQI value k, wherein the predicted CQI value is the estimated conditional expectation of the CQI value at time t+d for the specific CQI value k; wherein the predicted CQI value is denoted by
$\hat{X}_{t+d}^{Ref}(k)$;
wherein the predicted CQI value is obtained by calculating a result for $$\hat{X}_{t+d}^{Ref}(k) = \frac{1}{(\#X_t = k)} \sum_t (X_{t+d} \mid X_t = k),$$

wherein Xt is the CQI value at time t, and wherein # is the total number of received CQI values where the CQI at time t equals k for the plurality of user equipment.

2. The method of claim 1 further comprising obtaining a predicted CQI value for all respective used specific CQI values k in the radio access network.

3. The method of claim 2 further comprising creating a reference CQI prediction table by assembling all of the predicted CQI values for all respective used specific CQI values k in the radio access network.

4. The method of claim 2 wherein all the specific CQI values k used in the radio access network comprise an integer value in the range of 0-30.

5. The method of claim 3 wherein a communication session between the base station and an individual user equipment is established, and wherein the method further comprises: receiving the sequence of CQI values sampled at the times t=1 . . . n, from the individual user equipment during the communication session between the base station and the individual user equipment; estimating, for each of the specific CQI values received from the individual user equipment, a sample CQI prediction value at time t+d, given the specific CQI value at time t; obtaining an individual predicted CQI value at time t+d for the individual user equipment by forming a weighted average between the predicted CQI value and the sample CQI prediction value at time t+d; and updating the weighted average as a function of the statistics of the received sequence of CQI values during the communication session for the individual sample CQI prediction value, starting with a full weight on a predicted CQI value at the start of the communication session and decreasing the weight for increased received CQI value statistics during the communication session.

6. A method of predicting Channel Quality Indicator (CQI) values, the method being performed at a base station operating in a radio access network and comprising: receiving a sequence of Channel Quality Indicator (CQI) values sampled at times t=1 . . . n, from one or more user equipment; estimating, for each received specific CQI value k, a conditional expectation of the CQI value k at a time t+d, given the specific CQI value k at time t; and obtaining a predicted CQI value for the specific CQI value k, wherein the predicted CQI value is the estimated conditional expectation of the CQI value at time t+d for the specific CQI value k; obtaining a predicted CQI value for all respective used specific CQI values k in the radio access network; creating a reference CQI prediction table by assembling all of the predicted CQI values for all respective used specific CQI values k in the radio access network; establishing a communication session between the base station and an individual user equipment; receiving the sequence of CQI values sampled at the times t=1 . . . n, from the individual user equipment during the communication session between the base station and the individual user equipment; estimating, for each of the specific CQI values received from the individual user equipment, a sample CQI prediction value at time t+d, given the specific CQI value at time t; obtaining an individual predicted CQI value at time t+d for the individual user equipment by forming a weighted average between the predicted CQI value and the sample CQI prediction value at time t+d; and updating the weighted average as a function of the statistics of the received sequence of CQI values during the communication session for the individual sample CQI prediction value, starting with a full weight on a predicted CQI value at the start of the communication session and decreasing the weight for increased received CQI value statistics during the communication session; wherein the individual user equipment performs a handover from a source cell, served by the base station, to a destination cell, served by a destination base station; wherein the method further comprises sending, from the base station in the source cell, the individual sample CQI prediction value for all respective used specific CQI values k in the radio access network for the individual user equipment to the destination base station, such that the destination base station creates an individual sample CQI prediction value at time t+d for the individual user equipment in the destination cell by using both reference CQI prediction values created by the destination base station and the individual sample CQI prediction value for the individual user equipment created by the base station in the source cell.

7. A base station for a radio access network, the base station configured to communicate with at least one user equipment, and to establish a communication session between the base station and an individual user equipment that is configured to perform a handover from a source cell served by the base station to a destination cell served by a destination base station, the base station comprising: a receiver configured to receive a sequence of CQI values sampled at times t=1 . . . n, from one or more user equipment; an estimation unit configured to estimate, for each of the received specific CQI values k, a conditional expectation of the CQI value k at a time t+d, given the specific CQI value k at time t; a predicting unit configured to: obtain a predicted CQI value for the specific CQI value k, wherein the predicted CQI value is the estimated conditional expectation of the CQI value k at a time t+d for the specific CQI value k; obtain a predicted CQI value for all respective used specific CQI values k in the radio access network; and create a reference CQI prediction table by assembling all the predicted CQI values for all respective used specific CQI values k in the radio access network; and a transmitter configured to send the individual sample CQI prediction value for all respective used specific CQI values k in the radio access network for the individual user equipment from the base station in the source cell to the destination base station, such that the destination base station can create an individual sample CQI prediction value at time t+d for the individual user equipment in the destination cell by using both reference CQI prediction values created by the destination base station, and the individual sample CQI prediction value for the individual user equipment created by the base station in the source cell.

8. The base station of claim 7 wherein the receiver is further configured to receive the sequence of CQI values sampled at the times t=1 . . . n, from the individual user equipment during the communication session between the base station and an individual user equipment.

9. The base station of claim 8 wherein the predicting unit is further configured to obtain an individual predicted CQI value at the time t+d for the individual user equipment by forming a weighted average between the predicted CQI value and the sample CQI prediction value at time t+d, wherein the weighted average is updated as a function of the statistics of the received sequence of CQI values during the communication session for the individual sample CQI prediction value, starting with α=1 at the start of the communication session and decreasing a for increased received CQI value statistics during the communication session.

* * * * *

UNITED STATES PATENT AND TRADEMARK OFFICE
CERTIFICATE OF CORRECTION

PATENT NO. : 8,688,049 B2
APPLICATION NO. : 12/443244
DATED : April 1, 2014
INVENTOR(S) : Simonsson et al.

Page 1 of 1

It is certified that error appears in the above-identified patent and that said Letters Patent is hereby corrected as shown below:

In the Specification

In Column 5, Line 22, delete "k-16, k-19," and insert -- k=16, k=19, --, therefor.

In Column 7, Line 51, delete "cell 100." and insert -- cell 110. --, therefor.

In Column 9, Line 34, delete "1 Initially" and insert -- 1. Initially --, therefor.

In the Claims

In Column 11, Line 19, in Claim 1, delete "Xt" and insert -- $X_t$ --, therefor.

Signed and Sealed this
Ninth Day of September, 2014

Michelle K. Lee
*Deputy Director of the United States Patent and Trademark Office*